United States Patent [19]

Kato et al.

[11] Patent Number: 4,857,393
[45] Date of Patent: Aug. 15, 1989

[54] WATERPROOF WATER-VAPOR-PERMEABLE LAMINATED STRUCTURE AND APPLICATIONS OF THE SAME

[75] Inventors: Takeo Kato, Oomiya; Hideki Yamamoto, Yokohama; Naoki Miyazaki, Fukuoka, all of Japan

[73] Assignee: Toppan Printing Co., Ltd., Japan

[21] Appl. No.: 206,660

[22] Filed: Jun. 15, 1988

[30] Foreign Application Priority Data

Jun. 19, 1987 [JP] Japan ................................. 62-153064
Dec. 1, 1987 [JP] Japan ............................ 62-184101[U]

[51] Int. Cl.[4] ................................................ B32B 3/26
[52] U.S. Cl. ...................................... 428/289; 428/290; 428/304.4; 428/306.6; 428/308.4; 428/309.9; 428/316.6
[58] Field of Search ..................... 428/289, 290, 315.5, 428/315.7, 315.9, 316.6, 304.4, 306.6, 308.4, 309.9

[56] References Cited

U.S. PATENT DOCUMENTS 4,803,116  2/1989  Amano et al. ..................... 428/290

FOREIGN PATENT DOCUMENTS 60-52950  11/1985  Japan .

*Primary Examiner*—William J. Van Balen
*Attorney, Agent, or Firm*—Bacon & Thomas

[57] ABSTRACT

A waterproof water-vapor-permeable laminated structure obtained by extrusion-laminating a thermoplastic resin layer on a porous base material. This laminated structure is free from pin holes and has a good waterproof property and a feeling of the porous base material. The thermoplastic resin layer to be employed in the laminated structure is selected to have a melt viscosity of $5 \times 10^4$ poise (measurement conditions: load=10 kgf, nozzle diameter=1 mm, nozzle length=1 mm: JIS K 7311, 10) at a temperature lower than an extrusion temperature by 20° C. The laminated structure is suitable for use as a medical waterproof fabric, an inner bag of a coverlet and the like products.

12 Claims, 2 Drawing Sheets

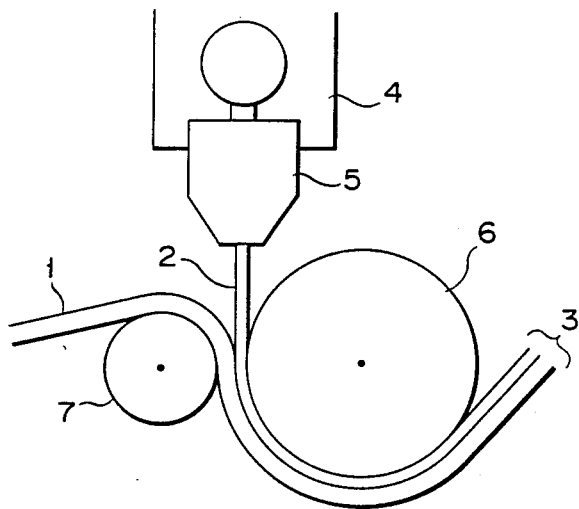
F I G. 1
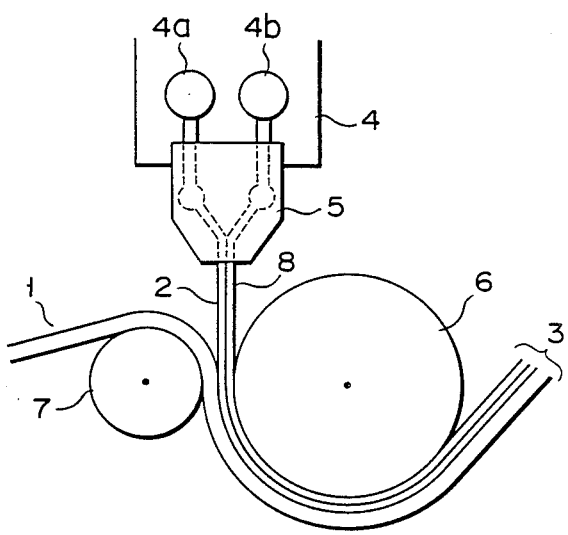
F I G. 2

WATERPROOF WATER-VAPOR-PERMEABLE LAMINATED STRUCTURE AND APPLICATIONS OF THE SAME

BACKGROUND OF THE INVENTION

1. Field of the Invention

The present invention relates to a waterproof water-vapor-permeable laminated structure obtained by laminating a porous base material and a thin thermoplastic resin film, not having pin holes through which a liquid passes, in which the feeling of the porous base material is not so much degraded, and which can be used as a waterproof material or a water-vapor-permeable material for a wrapping material, fabric, a medical material, a hygienic packaging material, and the like.

2. Description of the Prior Art

In general, methods of laminating a porous base material such as fabric, unwoven fabric, or paper and a thermoplastic resin film are classified in three types. In the first type, a thermoplastic resin film is manufactured beforehand by, e.g., a T-die casting method or an inflation method and then is adhered to a porous base material by an adhesive. In this method, best waterproof property can be obtained because pin holes are not formed. However, since the number of manufacturing steps is increased to increase manufacturing cost, applications are limited.

The second method is a so-called extrusion-laminating method in which a melted thermoplastic resin film is extruded directly on a porous base material and then laminated and cooled at the same time, thereby obtaining a laminated structure. This method is widely used because the laminated structure can be obtained by one step at low cost. However, in this method, a melted thermoplastic resin with low viscosity is pressed and adhered to a porous base material. Therefore, the thermoplastic resin enters into the porous material, or the melted thermoplastic resin film is finely broken by undulations or fibrous projections on the porous base material surface. As a result, pin holes tend to be formed. For this reason, in order to prevent pin holes and obtain good waterproof property, the thickness of the resin is increased. For example, in order to obtain good waterproof property in a laminated structure of unwoven fabric/polyethylene, the thickness of polyethylene must be 40 $\mu$ or more, and preferably, 60 $\mu$ or more. However, when the thickness of the resin is increased, the soft feeling of the porous base material such as fabric or unwoven fabric is naturally degraded. That is, the feeling of the obtained laminated structure is stiff and hard, thereby reducing the value as a product.

In the third method, a thermoplastic resin is dissolved in an organic solvent and coated on a porous base material by, e.g., gravure coating or roll coating, and then the solvent is volatilized. In this method, the solution penetrates into the porous base material, or pin holes tend to be formed mostly by entrapment of bubbles or volatilization of the solvent. Therefore, this method is most unsuitable for use in forming a waterproof layer and hence is generally used to obtain a sealing effect. Furthermore, in consideration of strike-through of the solution, porous base materials which can be used in this method are limited.

As described above, a laminated structure of a porous base material and a thermoplastic resin film, having good waterproof property without pin holes and maintaining the feeling of the porous base material, has not been obtained yet. Therefore, a strong demand has arisen for such a laminated structure.

SUMMARY OF THE INVENTION

It is, therefore, an object of the present invention to provide a waterproof water-vapor-permeable laminated structure obtained by extrusion-laminating a thermoplastic resin layer on a porous base material and having good waterproof property without pin holes and the feeling of the porous base material.

It is another object of the present invention to provide a waterproof water-vapor-permeable laminated structure suitable for an inner bag of a coverlet, medical waterproof fabric, operating gown fabric, and wind breaker fabric.

That is, the present invention provides a waterproof water-vapor-permeable laminated structure obtained by extrusion-laminating a thermoplastic resin layer having a melt viscosity of $5 \times 10^4$ poise (measurement conditions: load=10 kgf, nozzle diameter=1 mm, nozzle length=1 mm: JIS K 7311, 10) at a temperature lower than an extrusion temperature by 20° C. on a porous base material

BRIEF DESCRIPTION OF THE DRAWINGS

FIG. 1 is a schematic view showing a method of manufacturing a laminated structure according to the present invention;

FIG. 2 is a schematic view showing another method of manufacturing the laminated structure according to the present invention.

DETAILED DESCRIPTION OF THE PREFERRED EMBODIMENTS

Figure 3:
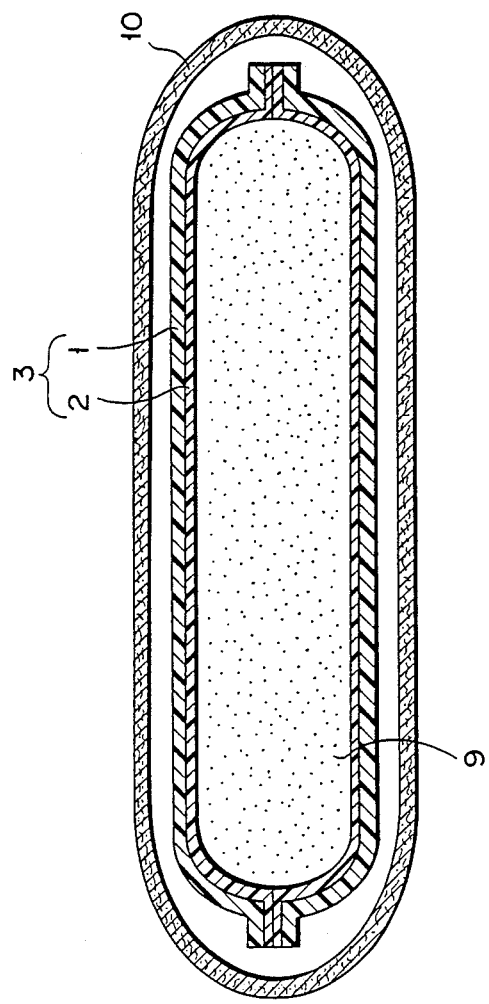
FIG. 3 is a sectional view showing a state obtained when the laminated structure according to the present invention is used as an inner bag of a coverlet.

A method of extrusion-laminating a laminated structure according to the present invention will be described below.

FIG. 1 is a schematic view of a method of extrusion-laminating a laminated structure of the present invention. In FIG. 1, porous base material 1 and thermoplastic resin 2 in a melted state are laminated to obtain laminated structure 3. That is, resin 2 is heated and melted by extruder 4 and then extruded through a slit of T-die 5 into a film. Film-like resin 2 is brought into contact with base material 1 and at the same time pressed between cooling roller 6 and press roll 7 to be continuously adhered to base material. Simultaneously resin 2 is rapidly cooled and solidified, thereby obtaining laminated structure 3.

In normal extrusion-laminating of a thermoplastic resin, a melt viscosity of the thermoplastic resin immediately after it is extruded from the T-die preferably falls within the range of $10^3$ to $10^4$ poise. If the viscosity is lower than the above range, a stable melted film cannot be formed, and hence a laminated structure having a uniform resin thickness cannot be obtained. If the viscosity is higher than the above range, the melted film cannot be stably taken up, and hence serging of the resin thickness occurs. If a takeup speed is increased, the film is cut, and therefore extrusion-laminating cannot be performed. In addition, if the thermoplastic resin is extruded with a high viscosity, high load acts on an extruder motor, resulting in uneven extrusion or heat generation in the extruder. Therefore, it is difficult to perform stable extrusion-laminating. For this reason, in order to perform extrusion-laminating of various thermoplastic resins, an extruder heating temperature is set so that the viscosity falls within the above suitable range.

As shown in FIG. 1, melted resin 2 is naturally cooled in range of a certain distance (which is called an "air gap" and normally 10 to 15 cm) between T-die 5 and a press-adhering portion. After resin 2 is adhered, it is forcibly cooled by the cooling roller. According to actual measurement, the temperature of the resin at the press-adhering portion is lower than that at an extrusion port of the T-die by 20° to 30° C.

In the present invention, it is important to use a thermoplastic resin having a melt viscosity which falls within the above suitable viscosity range immediately after it is extruded from T-die 5 and a melt viscosity of $5 \times 10^4$ poise or more when it reaches the press-adhering portion, i.e., when the resin temperature is lower than the extrusion temperature by 20° C. That is, it is important to use a thermoplastic resin having a steep melt viscosity increase curve at temperatures lower than the extrusion temperature. When a thermoplastic resin having a melt viscosity of $5 \times 10^4$ poise at a temperature lower than the extrusion temperature by 20° C. was used, a laminated structure without pin holes was obtained although the resin thickness was 5 to 30 $\mu$m, preferably 5 to 20 $\mu$m. Meanwhile, when a thermoplastic resin having a melt viscosity of $5 \times 10^4$ poise or less was used, pin holes were increased as the viscosity is reduced. When a thermoplastic resin having a melt viscosity of about $1 \times 10^4$ poise was used, some holes were locally found even with a thickness of 50$\mu$. That is, the waterproof property of the resultant laminated structure was not perfect, and its feeling was poor.

The melt viscosity was measured on the basis of JIS K 7311, 10 (1987) under the conditions such that load=10 kgf, nozzle diameter=1 mm, and nozzle length=1 mm.

Thermoplastic resin 2 used in the present invention is not limited as long as its melt viscosity at a temperature lower than the extrusion temperature by 20° C. is $5 \times 10^4$ poise or more. Preferable examples of the resin which satisfy this condition are a polyurethane resin, a polyamide resin, and a polyester resin.

The urethane, polyamide, and polyester resins have a large melt viscosity change with respect to a temperature change and therefore are suitable for the object of the present invention. However, in consideration of extrusion-manufacture property, these resins have poor stability, and therefore require temperature control with high accuracy. Furthermore, in the present invention, since a resin with a high temperature dependency of the melt viscosity and a poor extrusion-manufacture property must be used and the resin thickness must be minimized, a coextrusion-coating method (see FIG. 2) disclosed in Japanese Patent Publication No. 60-52950 can be used.

A difference between this coextrusion-coating method. and the method shown in FIG. 1 is such that extruder 4 comprises two extruder cylinders 4a and 4b. Thermoplastic resin to be coated on a porous base material is flowed into cylinder 4a, and a peelable resin having peelability with respect to the thermoplastic resin is flowed into cylinder 4b. These resins are extruded as a laminated structure of thermoplastic resin film 2 and peelable resin film 8 from die 5 and guided between cooling roll 6 and press rubber roll 7. The laminated structure is laminated on porous base material 1, and only peelable resin film 8 is peeled therefrom. In FIG. 2, the same parts as in FIG. 1 are denoted by the same reference numerals, and a detailed description thereof will be omitted.

More specifically, thermoplastic resin layer 2 consisting of an urethane resin, a polyamide resin, or a polyester resin and resin layer 8 consisting of polyethylene or polypropylene having peelability with respect to layer 2 are coextrusion-laminated by the coextruding method so that layer 2 is adhered on the porous base material, and then layer 8 is peeled to obtain a desired laminated structure. According to this coextrusion method, the resin thickness can be reduced to several microns.

If some degree of water vapor permeability is desired, it is desirable to make the water vapor permeability of the thermoplastic resin to have 800 g/m$^2$·24hrs., preferably 1000 g/m$^2$·24hrs. or more.

Note that in order to increase the water vapor permeability, 5 to 30 wt % of a polyethylen oxide-based water-absorbing resin may be blended with a polyurethane resin, a polyamide resin or a polyester resin which constitutes the thermoplastic resin.

Examples of the polyethylene oxide water-absorbing resin are SUMICAGEL R-30F and SUMICAGEL R-30R (tradenames) available from SUMITOMO CHEMICAL CO., LTD, AQUAPRENE P-810 (tradename) MEISEI KAGAKU K.K., and VITERRA (tradename) available from Nepera CO., LTD.

If the content of the water-absorbing resin is 5 wt % or less, the water vapor permeability cannot be sufficiently improved. Meanwhile, if the content exceeds 30 wt %, the rate of increase of the water vapor permeability is reduced to undesirably degrade the film strength.

Porous base material 1 used in the present invention is a porous material not having waterproof property itself such as fabric or unwoven fabric of synthetic fiber or natural fiber, paper, and a foam sheet.

According to the present invention, when a porous base material and a thermoplastic resin film are laminated by the extrusion-laminating method, the melt viscosity of the melted thermoplastic resin at the lamination temperature is increased. Therefore, the melted film strength is enhanced to suppress strike-through of the film into the porous base material. In addition, since the melted film is prevented from being finely broken by undulations or fibrous projections on the surface of the porous base material, pin holes are not formed. As a result, the thickness of the thermoplastic resin can be reduced much smaller than that obtained by conventional methods, and the feeling of the porous base material is not so much degraded. Therefore, a laminated structure without pin holes can be obtained.

As described above, the laminated structure according to the present invention is free from pin holes, has good waterproof property, water vapor permeability, and feeling, and can be easily washed. Therefore, the laminated structure can be used not only as fabric for outdoor use but also as fabric for, e.g, sheets and operating gowns used in hospitals, wind breakers, and inner bags of a coverlet containing cotton or the like.

EXAMPLE 1

Nylon unwoven fabric (measured weight=24 g/m$^2$) was used as a porous base material, polyurethane resin E580PNAT (tradename) available from Nippon Elastran K.K. was used as a thermoplastic resin, and polyethylene resin MIRASON 16P (tradename) available from Mitsui Petrochemical Industries, Ltd. was also used as the thermoplastic resin but for comparison, thereby obtaining seven types of a laminated structure having different resin thicknesses by an extrusion-laminating method. The polyurethane resin was coextrusion-laminated with polypropylene NOBREN FL25B (tradename) available from Mitsubishi Petrochemical Co., Ltd., and then the polypropylene was peeled, thereby obtaining a laminated structure of the unwoven fabric/polyurethane resin. The extrusion temperature condition and melt viscosity are shown in Tables 1 and 2 below.

TABLE 1

| Extruder | Resin | Coextrusion Conditions of Polyurethane Resin | | | | | Melt Viscosity (Poise) | |
|---|---|---|---|---|---|---|---|---|
| | | Extrusion Temperature Condition (°C.) | | | | | | |
| | | Cylinder 1 | Cylinder 2 | Cylinder 3 | Adaptor | T-die | at 210° C. | at 190° C. |
| 50 mm φ | PU | 180 | 190 | 210 | 210 | 210 | $9 \times 10^3$ | $8.5 \times 10^4$ |
| 40 mm φ | PP | 180 | 190 | 210 | 210 | 210 | $1 \times 10^4$ | $1.2 \times 10^4$ |

PU: Polyurethane
PP: Polypropylene

TABLE 2

| Extruder | Resin | Extrusion Conditions of Polyethylene Resin | | | | | Melt Viscosity (poise) | |
|---|---|---|---|---|---|---|---|---|
| | | Extrusion Temperature Condition (°C.) | | | | | | |
| | | Cylinder 1 | Cylinder 2 | Cylinder 3 | Adaptor | T-die | at 310° C. | at 290° C. |
| 50 mm φ | PE | 250 | 280 | 310 | 310 | 310 | $9.5 \times 10^3$ | $1.4 \times 10^4$ |

PE: Polyethylene

The obtained seven types of a laminated structure were subjected to a pin hole test and their feelings were evaluated. Results are summarized in Table 3. Note that the pin hole test was conducted as follows. That is, 20 ml of a methylene blue solution (methylene blue=0.3 g/water=100 ml) were uniformly absorbed into the surface of the unwoven fabric of a 20×20-cm laminated structure, and aluminum plate/filter paper/ polyurethane resin (or polyethylene resin)/unwoven fabric /aluminum plate were stacked in the order named. Then, a load of 10 kgf was applied on the resultant structure over five minutes, and the number of blue dots of the methylene blue leaked on the filter paper were counted.

loop along its radial direction was measured to evaluate the nerve. In a wash test, 20×20-cm samples were washed by a household washing machine using a neutral detergent for an hour, linsed for 15 minutes, spin-dried, and then air-dried for five minutes.

According to the results shown in Table 3, a waterproof material having very good feeling without pin holes could be obtained from a laminated structure using 10 μ or more of the polyurethane resin having a melt viscosity of $8.5 \times 10^4$ poise at a temperature (at 190° C.) lower than the extrusion temperature by 20° C. The properties of such a material could be maintained after it was subjected to the wash test. Meanwhile, if the resin thickness of a laminated structure using the polyethylene resin having a melt viscosity of $1.4 \times 10^4$ poise at a temperature (at 290° C.) lower than the extrusion temperature by 20° C. was less than 60 μ, pin holes were formed, and the feeling of the laminated structure was hard and stiff.

EXAMPLE 2

Rayon unwoven fabric (measured weight=85 g/m²) was used as a porous base material, and two types of polyurethane resin having different melt viscosities, i.e., polyurethane A E780P18 (tradename) available from Nippon Elastran K.K. and polyurethane B PARA-

TABLE 3

| | Sample | 1 | 2 | 3 | 4 | Comparative Example 1 | Comparative Example 2 | Comparative Example 3 |
|---|---|---|---|---|---|---|---|---|
| Laminated Structure Arrangement | Unwoven Fabric | Nylon | " | " | " | " | " | " |
| | Resin | PU | " | " | " | PE | " | " |
| | Thickness (μ) | 5 | 10 | 20 | 40 | 20 | 40 | 60 |
| Property Evaluation before Washing | Pin Holes | 2~3 | 0 | 0 | 0 | 20~30 | 4~5 | 0 |
| | Feeling | 66~ | | | | Δ | × | × |
| | Nerve (g) | 0.15 | 0.18 | 0.27 | 0.41 | 0.50 | 0.69 | 0.85 |
| | Permeability (g/m² · 24 hrs.) | 1900 | 1500 | 1000 | 700 | — | — | — |
| Property Evaluation after Washing | Pin Holes | 5~7 | 0 | 0 | 0 | 30 or More | 9~10 | 0~1 |
| | Feeling | | | | Δ~ | Δ~ | × | × |
| | Nerve (g) | 0.13 | 0.17 | 0.24 | 0.37 | 0.37 | 0.62 | 0.8 |

PU: Polyurethane
PE: Polyethylene
... Good
Δ ... Fair
× ... Poor

In Table 3, feeling is a result of touch evaluation. In nerve evaluation, each sample was cut out in a 20-mm wide piece and looped, and a force required to press the PRENE P25MRNAT (tradename) available from Nippon Polyurethane K.K. were used as a thermoplastic resin and coextrusion-laminated with polypropylene NOBREN FL25B (tradename) available from Mitsubishi Petrochemical Co., Ltd. Then, the polypropylene was peeled from the resultant material, thereby obtaining six types of a laminated structure having different polyurethane resin thicknesses.

The extrusion temperature condition and melt viscosity are shown in Tables 4 and 5. Results of a pin hole test and feeling evaluation of the obtained six types of a laminated structure are shown in Table 6. Note that evaluation was performed following the same procedures as in Example 1.

not formed even if the resin thickness was 10 μ, and the feeling of the obtained laminated structure was good. Therefore, this laminated structure can be used as an excellent waterproof material.

EXAMPLE 3

Nylon fabric (measured weight=35 g/m$^2$) was used as a porous base material, and PEBAX 3533SNOO (tradename, polyamide resin (elastomer)) available from ATOCHEM Industries Ltd. was used as a thermoplastic resin. Using these materials, five types of a laminated structure were obtained by the single-layer extrusion-

TABLE 4

| | | Coextrusion Conditions of Polyurethane Resin | | | | | Melt Viscosity (Poise) | |
|---|---|---|---|---|---|---|---|---|
| | | Extrusion Temperature Condition (°C.) | | | | | | |
| | | Cylinder | Cylinder | Cylinder | | | | |
| Extruder | Resin | 1 | 2 | 3 | Adaptor | T-die | at 180° C. | at 160° C. |
| 50 mm φ | PU-A | 150 | 160 | 180 | 180 | 180 | 1.4 × 10$^4$ | 4.0 × 10$^4$ |
| 40 mm φ | PP | 180 | 200 | 210 | 211 | 180 | — | — |

PU: Polyurethane
PP: Polypropylene

TABLE 5

| | | Extrusion Conditions of Polyurethane Resin | | | | | Melt Viscosity (Poise) | |
|---|---|---|---|---|---|---|---|---|
| | | Extrusion Temperature Condition (°C.) | | | | | | |
| | | Cylinder | Cylinder | Cylinder | | | | |
| Extruder | Resin | 1 | 2 | 3 | Adaptor | T-die | at 190° C. | at 170° C. |
| 50 mm φ | PU-B | 170 | 190 | 190 | 190 | 190 | 1.3 × 10$^4$ | 7.5 × 10$^4$ |
| 40 mm φ | PP | 180 | 200 | 210 | 210 | 190 | — | — |

PU: Polyurethane
PP: Polypropylene

TABLE 6

| | Sample | 5 | 6 | 7 | Comparative Example 4 | Comparative Example 5 | Comparative Example 6 |
|---|---|---|---|---|---|---|---|
| Laminated Structure Arrangement | Unwoven Fabric | Rayon | " | " | " | " | " |
| | Resin | PU-B | " | " | " | " | " |
| | Thickness (μ) | 10 | 20 | 40 | 10 | 20 | 40 |
| Property Evaluation before Washing | Pin Holes | 0 | 0 | 0 | 4 ~ 5 | 2 ~ 3 | 0 |
| | Feeling | | | Δ ~ | | | Δ ~ |
| | Nerve (g) | 0.27 | 0.39 | 0.49 | 0.25 | 0.36 | 0.48 |
| | Permeability (g/m$^2$ · 24 hrs.) | 1500 | 1000 | 700 | 1500 | 1000 | 800 |
| Property Evaluation after Washing | Pin Holes | 0 | 0 | 0 | 7 ~ 8 | 4 ~ 5 | 0 ~ 1 |
| | Feeling | | | Δ ~ | | | Δ ~ |
| | Nerve (g) | 0.21 | 0.35 | 0.45 | 0.23 | 0.31 | 0.45 |

PU: Polyurethane

According to the evaluation results of Table 6, when polyurethane A having a melt viscosity of 4.0×10$^4$ poise at a temperature lower than the extrusion temperature by 20° C. was used, the number of formed pin holes was smaller than that of pin holes formed in the polyurethane resin as shown in Table 3 of Example 1. However, in order to obtain perfect waterproof property, the resin thickness must be 40 μ or more. Meanwhile, when polyurethane B which satisfied the conditions of the present invention was used, pin holes were laminating method as shown in FIG. 1.

The extrusion temperature condition and melt viscosity are shown in Table 7. Evaluation results of the obtained five types of a laminated structure are summarized in Table 8.

TABLE 7

| | | Extrusion Conditions of Nylon Resin | | | | | Melt Viscosity (Poise) | |
|---|---|---|---|---|---|---|---|---|
| | | Extrusion Temperature Condition (°C.) | | | | | | |
| | | Cylinder | Cylinder | Cylinder | | | | |
| Extruder | Resin | 1 | 2 | 3 | Adaptor | T-die | at 190° C. | at 170° C. |
| 50 mm φ | Polyamide | 170 | 180 | 190 | 190 | 190 | 0.9 × 10$^4$ | 5.3 × 10$^4$ |

TABLE 8

| | Sample | 8 | 9 | 10 | 11 | 12 |
|---|---|---|---|---|---|---|
| Laminated Structure Arrangement | Porous Base Material | Nylon Fabric | " | " | " | " |
| | Resin | Ny | " | " | " | " |
| | Thickness (μ) | 10 | 15 | 20 | 30 | 40 |
| Property Evaluation of Crease-Flex Test | Pin Holes | 0 | 0 | 0 | 0 | 0 |
| | Feeling | | | | ~Δ | Δ |
| | Permeability (g/m² · 24 hrs.) | 4100 | 3500 | 3100 | 2500 | 2100 |
| Property Evaluation of Crease-Flex Test | Pin Holes | 0 | 0 | 0 | 0 | 0 |
| | Feeling | | | | ~Δ | × |
| | Permeability (g/m² · 24 hrs.) | 4100 | 3500 | 3100 | 2500 | 2100 |

Ny: 6-Nylon

EXAMPLE 4

A two-pack urthane adhesive was coated and dried on polyester unwoven fabric (measured weight=34 g/m²) as a porous base material polyester resin (elastomer) GRILUX E-500 (tradename) available from DAI-NIPPON INK & CHEMICALS, INC. was used as a thermoplastic resin, and polyethylene resin MIRASON 16P (tradename) available from Mitsui Petrochemical Industries, Ltd. was also used as the thermoplastic resin for comparison. These materials were monolayer extrusion-laminated as shown in FIG. 1 to obtain seven types of a laminated structure having different resin thicknesses. The extrusion temperature condition and melt viscosity of the polyester resin (elastomer) are shown in Table 10. Results of a pin hole test and feeling evaluation of the obtained seven types of a laminated structure are summarized in Table 10. Note that the extrusion temperature condition and melt viscosity of the polyethylene resin were the same as those in Example 1, and the laminated structures were evaluated following the same procedures as in Example 1.

TABLE 9

| Extruder | Resin | Extrusion Temperature Condition (°C.) | | | | | Melt Viscosity (Poise) | |
|---|---|---|---|---|---|---|---|---|
| | | Cylinder 1 | Cylinder 2 | Cylinder 3 | Adaptor | T-die | at 210°C. | at 190° C. |
| 50 mm φ | Polyester Resin | 190 | 200 | 210 | 210 | 210 | 6.0 × 10³ | 9.2 × 10⁴ |

TABLE 10

| | | Sample 13 | Sample 14 | Sample 15 | Sample 16 | Comparative Example 7 | Comparative Example 8 | Comparative Example 9 |
|---|---|---|---|---|---|---|---|---|
| Laminated Structure Arrangement | Unwoven Fabric | Polyester Unwoven Fabric | " | " | " | " | " | " |
| | Thermoplastic Resin | Polyester Resin | " | " | " | Polyethylene Resin | " | " |
| | Resin Thickness | 5μ | 10μ | 20μ | 40μ | 20μ | 40μ | 60μ |
| Property Evaluation before Washing | Pin Holes (Number) | 4 ~ 5 | 0 | 0 | 0 | 20 ~ 30 | 5 ~ 6 | 0 |
| | Feeling | | | | Δ ~ ° | Δ | × | × |
| | Nerve (g) | 0.18 | 0.22 | 0.31 | 0.48 | 0.56 | 0.72 | 0.89 |
| | Permeability (g/m² · 24 hrs.) | 3500 | 2700 | 2400 | 1500 | — | — | — |
| Property Evaluation after Washing | Pin Holes (Number) | 7 ~ 9 | 0 | 0 | 0 | 30 or More | 10 ~ 11 | 0 ~ 1 |
| | Feeling | | | | Δ ~ | Δ ~ | × | × |
| | Nerve (g) | 0.15 | 0.19 | 0.27 | 0.45 | 0.51 | 0.69 | 0.85 |

According to the results listed in Table 10, when 15 μ or more of the polyester resin having a melt viscosity 9.2×10⁴ poise at a temperature (at 190° C.) lower than the extrusion temperature by 20° C. was used, the obtained laminated structure had no pin holes. Therefore, waterproof materials having very good feeling were obtained. The properties of these materials could be maintained after they were subjected to the wash test. Meanwhile, when the polyethylene resin having a melt viscosity of 1.4×10⁴ poise at a temperature (at 290° C.) lower than the extrusion temperature by 20° C. was used, pin holes were formed in the obtained laminated structure unless the resin thickness was 60 μ or more. In addition, the feeling of the laminated structure was hard and stiff.

EXAMPLE 5

When urethane B of Example 2 was polymerized, 0 to 35 wt % of polyethylene oxide water-absorbing resin SUMICAGEL R-30R (tradename) available from SUMITOMO CHEMICAL CO., LTD. were blended, thereby obtaining a polyurethane resin.

These polyurethane resin and polypropylene were coextrusion-laminated to form a film, and then the polypropylene was peeled. As a result, nine types of a 20-μ thick polyurethane film without pin holes were obtained.

For comparison, using a 20-μ thick fine porous urethane water-vapor-permeable waterproof film obtained by a wet film formation method, water vapor permeability, waterproof pressure, tensile strength, extensibility, and feeling were evaluated. Results are shown in Table 11.

TABLE 11

| Items | 1 | 2 | 3 | 4 | 5 | 6 | 7 | 8 | Comparative Example 1 |
|---|---|---|---|---|---|---|---|---|---|
| Film Thickness ($\mu$) | 20 | 20 | 20 | 20 | 20 | 20 | 20 | 20 | 20 |
| Polyethylene Oxide Resin Content (wt %) | 0 | 5 | 10 | 15 | 20 | 25 | 30 | 35 | 0 |
| Permeability (g/m² · 24 hr) | 1600 | 2000 | 3100 | 3700 | 4800 | 5600 | 6900 | 6900 | 4500 |
| Water-Proofness (mm H₂O) | 2000 or More | 2000 or More | 2000 or More | 2000 or More | 2000 or More | 2000 or More | 2000 or More | 2000 or More | 1500 |
| Tensile Strength (kg/cm²) | 550 | 530 | 530 | 530 | 510 | 500 | 500 | 470 | 98 |
| Extensibility (%) | 600 | 600 | 590 | 580 | 560 | 540 | 510 | 460 | 320 |
| Feeling | | | | | | | ○ | ○ | △ |

According to the results shown in Table 11, the water vapor permeability was increased by blending the polyethylene oxide water-absorbing resin into the polyurethane resin. The water vapor permeability was increased twice that of a polyurethane film not containing the polyethylene oxide water-absorbing resin when the content was 10 wt % and three times that when the content was 20 wt %. That is, the water vapor permeability was higher than that of a conventional fine porous urethane water-vapor-permeable waterproof film.

The waterproof pressure of the water-vaporpermeable waterproof films without holes according to the present invention was 2,000 mmH₂O or more, i.e., they had perfect waterproof property because they were free from pin holes. In addition, since the films mainly consist of a polyurethane resin and have no holes, they maintain original high mechanical strength such as tensile strength and extensibility of a polyurethane film. Especially, as is apparent from the values of tensile strength, film strength was much higher than that of the conventional fine porous urethane water-vapor-permeable waterproof film.

Furthermore, the polyurethane film not containing the polyethylene oxide water-absorbing resin and the water-vapor-permeable waterproof film without holes according to the present invention was soft and had good drape property and excellent feeling. Meanwhile, softness of the fine porous urethane water-vapor-permeable waterproof film was poor, and its feeling was more or less stiff.

EXAMPLE 6

FIG. 3 shows an example in which the waterproof water-vapor-permeable laminated structure of the present invention is used as an inner bag of a coverlet. In FIG. 3, waterproof water-vapor-permeable laminated structure 3 consisting of porous base material 1 and thermoplastic resin layer 2 laminated on material 1 covers content 9, and outer bag 10 covers laminated structure 3. Since laminated structure 3 is used as an inner bag in this arrangement, even if materials having short fiber length, e.g., animal fibers such as feathers or wools or vegetable fibers such as cotton are packed as the content, they do not break through nor scatter from the inner and outer bags. Therefore, clothing or rooms are not contaminated, resulting in a sanitary advantage. In addition, since unwoven fabric provided with the above thermoplastic resin layer is used as a material for the inner bag, an air flow in the inner bag is suppressed to improve heat retaining properties of the coverlet as a whole.

As is apparent from the above description and examples, according to the present invention, in extrusion-lamination of the porous base material and the thermoplastic resin, a laminated structure without pin holes can be obtained even if the resin thickness is reduced much smaller than that obtained by the conventional method. As a result, an excellent waterproof material having good feeling which cannot be obtained by the conventional material can be obtained.

Furthermore, the laminated structure can be obtained by the extrusion-laminating method or the coextrusion-laminating method, i.e., in a single manufacturing step. As a result, the manufacturing cost and losses are reduced, and an inexpensive waterproof material can be obtained.

What is claimed is:

1. A waterproof water-vapor-permeable laminated structure obtained by extrusion-laminating a thermoplastic resin layer having a melt viscosity of $5 \times 10^4$ poise at a temperature lower than an extrusion temperature by 20° C. (measurement conditions: load=10 kgf, nozzle diameter=1 mm, nozzle length=1 mm: JIS K 7311, 10) on a porous base material.

2. A structure according to claim 1, wherein said thermoplastic resin layer is selected from the group consisting of a urethane resin, a polyamide resin, and a polyester resin.

3. A structure according to claim 1, wherein a thickness of said thermoplastic resin layer falls within a range of 5~30 $\mu$ preferable 5 to 20 $\mu$m.

4. A structure according to claim 1, wherein said thermoplastic resin layer is coextrusion-laminated together with a resin layer having peelability with respect to said thermoplastic resin layer.

5. A structure according to claim 1, wherein said thermoplastic resin layer consists of a resin obtained by blending 5 to 30 wt % of a polyethylene oxide water-absorbing resin into a thermoplastic resin.

6. A structure according to claim 3, wherein said thermoplastic resin layer consists of a resin obtained by blending 5 to 30 wt % of a polyethylene oxide water-absorbing resin into a thermoplastic resin.

7. A structure according to claim 4, wherein said thermoplastic resin layer consists of a resin obtained by blending 5 to 30 wt % of a polyethylene oxide water-absorbing resin into a thermoplastic resin.

8. A structure according to claim 4, wherein said resin layer consists of polyethylene or polypropylene.

9. A structure according to claim 1, wherein said waterproof water-vapor-permeable laminated structure is used as an inner bag of a coverlet.

10. A structure according to claim 1, wherein said waterproof water-vapor-permeable laminated structure is used as fabric for medical waterproof sheets.

11. A structure according to claim 1, wherein said waterproof water-vapor-permeable laminated structure is used as fabric for operating gowns.

12. A structure according to claim 1, wherein said waterproof water-vapor-permeable laminated structure is used as fabric for wind breakers.

* * * * *